United States Patent [19]
Vaughen

[11] 3,774,716
[45] Nov. 27, 1973

[54] ANTIDRIFT MECHANISM FOR AN AIR CUSHION VEHICLE

[76] Inventor: Jack F. Vaughen, 26807 Spring Creek Rd., Palos Verdes Peninsula, Calif. 90274

[22] Filed: Jan. 19, 1972

[21] Appl. No.: 219,000

[52] U.S. Cl. .............................. 180/119, 280/124 R
[51] Int. Cl. .............................................. B60v 1/00
[58] Field of Search ................. 180/119, 7; 280/124

[56] References Cited
UNITED STATES PATENTS

| | | | |
|---|---|---|---|
| 3,246,712 | 4/1966 | Mackie | 180/119 |
| 2,507,656 | 5/1950 | Wicks | 280/124 R |

Primary Examiner—Philip Goodman
Attorney—Jess M. Roberts et al.

[57] ABSTRACT

A transverse axle structure carries a pair of ground wheels and two downwardly divergent arms connect the vehicle to the axle structure. Pivot means connect the upper ends of the two arms to the vehicle and additional pivot means connect the lower ends of the arms to corresponding slidable collars on the axle structure, the axes of all four pivot means extending longitudinally of the vehicle. When the vehicle tends to drift to one side, the slidable collar on that side abuts a corresponding stop on the axle structure to place the arm on that side under longitudinal compression to limit the drift of the vehicle relative to the two ground wheels.

12 Claims, 3 Drawing Figures

PATENTED NOV 27 1973 3,774,716
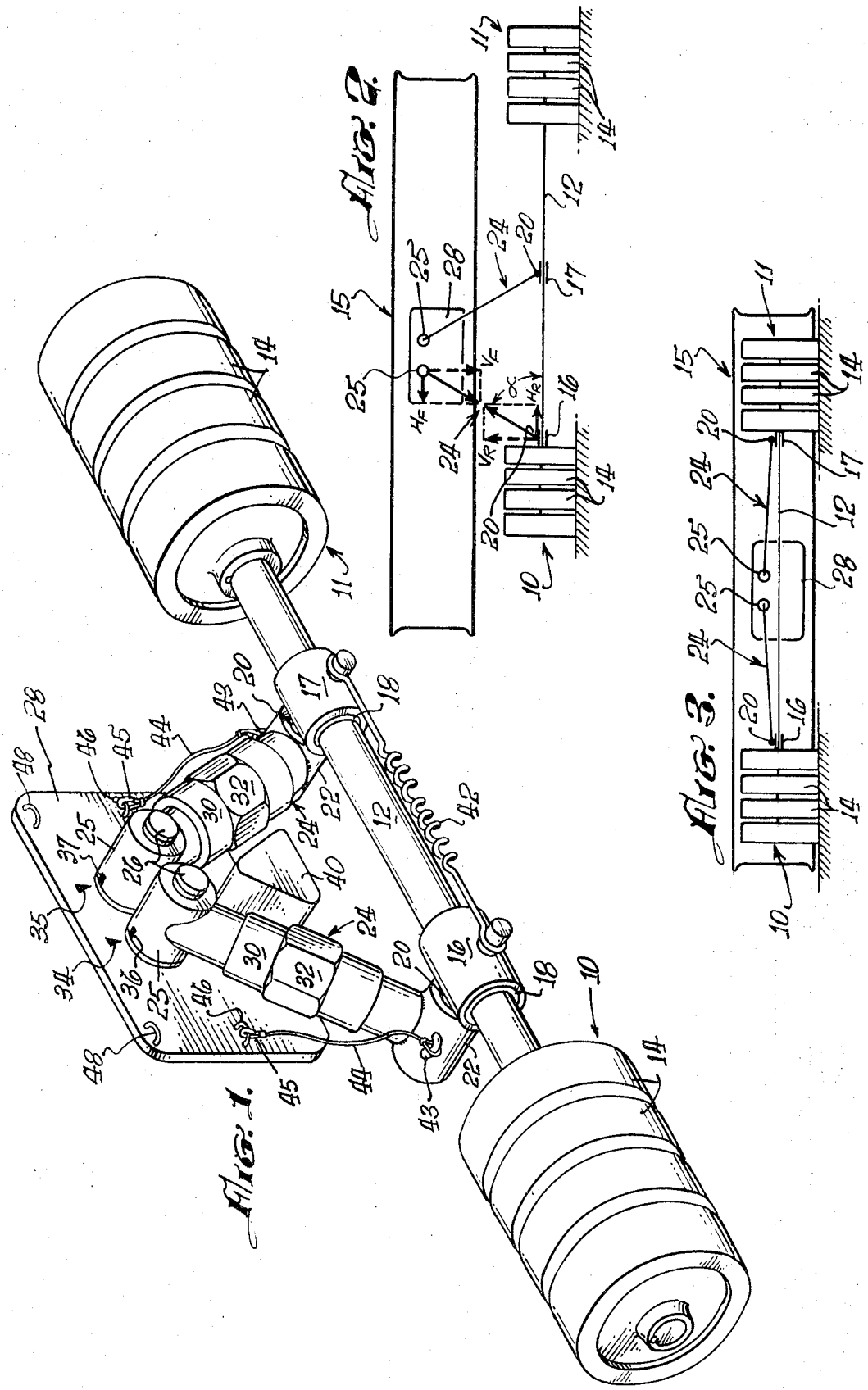

ANTIDRIFT MECHANISM FOR AN AIR CUSHION VEHICLE

BACKGROUND OF THE INVENTION

Since friction is eliminated between an air cushion vehicle and the underlying support surface over which it travels, the vehicle tends to drift sideways down a lateral slope of the support surface. Thus, if the air cushion vehicle is moving along a road that is sloped to one side for drainage, or if a strong cross wind urges the vehicle to one side, the vehicle tends to drift to that side of the road. Such sidewise drift is at least hazardous and it may cause the air cushion vehicle to go out of control.

SUMMARY OF THE INVENTION

The primary object of the invention is to provide a ground wheels assembly for an air cushion vehicle which will safely limit the lateral drift of the vehicle. For this purpose a pair of relatively wide spaced sets of ground wheels are mounted on the opposite ends of a transverse axle structure and the structure of the air cushion vehicle is connected by a pair of downwardly divergent arms to corresponding slidable collars on the axle structure.

The upper ends of the two divergent arms are connected to the structure of the air cushion vehicle by corresponding pivots and the lower ends of the two arms are connected by similar pivots to the two slidable collars respectively, the axes of all of four pivots extending longitudinally of the air cushion vehicle. When the air cushion vehicle tends to drift to one side, the slidable collar on that side moves against a corresponding stop means on the axle structure to place the corresponding arm under longitudinal compression at a limit position of the arm to limit the lateral drift of the air cushion vehicle.

If the angle of the arm at its limit position relative to the axle structure is such that the numerical ratio of the lateral force component to the downward force component of a load on the upper end of the arm is less than the coefficient of skidding friction of the ground wheels on the underlying support surface, it is physically impossible for the ground wheels to skid sidewise. In other words, the ground wheels cannot skid sidewise if the coefficient of skidding friction of the ground wheels on the underlying support surface exceeds the cotangent of the angle of the arm relative to the transverse axle structure.

Preferably each of the two arms is adjustable in length. Such adjustment makes it possible to vary the angle of each arm relative to the axle structure at the limit position of the arm and also makes it possible to compensate periodically for wear on the ground wheels as well as wear on the means that confines the air cushion under the vehicle.

Preferably means is provided to keep the two arms from swinging to positions perpendicular to the transverse axle structure. For this purpose means fixedly united with the structure of the vehicle is positioned between the two arms.

It may be desirable to provide means to urge the ground wheels downwardly from the air cushion vehicle to insure that the wheels make effective contact with the underlying support surface. A feature of the invention is that this purpose is served simply by attaching the opposite ends of a tension spring to the two collars to urge the two collars toward each other.

A further feature of the invention is the concept of providing means to suspend the ground wheels temporarily out of contact with the underlying support surface whenever desired.

The various features and advantages of the invention may be understood from the following description and the accompanying drawing.

BRIEF DESCRIPTION OF THE DRAWING

FIG. 1 is a perspective view of a ground wheels assembly which may be attached to any air cushion supported device to prevent sideward drift during operation over a laterally sloping surface;

FIG. 2 is a schematic profile view of the ground wheels assembly attached to a floating air cushion platform which is subjected to a sideward force; and FIG. 3 is a schematic profile view of the ground wheels assembly attached to an air cushion platform which is at rest on its bottom structure without lifting air supplied.

DESCRIPTION OF THE PREFERRED EMBODIMENT OF THE INVENTION

FIG. 1 is a perspective view of a ground wheels assembly embodying the invention which assembly may be attached to any air cushion supported device to prevent sideward skidding during operation on a laterally sloping underlying support surface or during operation under a strong cross wind. The ground wheels assembly offers virtually no resistance to vertical or longitudinal movement of the air cushion conveyance to which it is attached but if the conveyance attempts to move laterally the ground wheels automatically build up very high side friction forces to resist the lateral movement.

As shown in FIG. 1 the ground wheels assembly comprises two ground wheels 10 and 11 mounted opposite ends of a common transverse axle structure 12. Each of the ground wheels 10, 11 is relatively broad for high resistance to skidding and for this purpose each ground wheel may actually comprise a plurality of wheel units 14 as shown. As shown schematically in FIG. 3 the diameter of the ground wheels may be less than the static or non-floating height of an air cushion platform 15 to which they are attached. Obviously, the platform can be floated on air cushions at slightly greater height for movement into effective position under an auxiliary cargo conveyance without removing the ground wheels assembly.

The axle structure 12 is free to rotate in low friction bushings or bearings (not shown) inside two spaced slide members in the form of collars 16, 17 which collars are free to slide axially along the axle structure 12. Both ends of each slidable collar 16, 17 may be fitted with protective seals 18 which wipe the axle structure clean as the collar slides along the axle structure and thus prevent dirt from entering bearings or bushings inside the collar. If desired, optional dust bellows (not shown) may be installed between the two sliding collars 16, 17, between the collar 16 and the wheel 10, and between collar 17 and wheel 11 to prevent dust from coating the axle structure.

Each of the slidable collars 16, 17 is provided with a radially positioned spindle 20 which is perpendicular to the axle structure 12. These spindles are journalled in corresponding low friction bushings or bearings (not shown) in bearing holders 22 which are rigidly mounted on the lower ends of two corresponding downwardly divergent struts or arms 24 which connect the transverse axle structure 12 to the structure of the air cushion vehicle. The axes of the bearing holders 22 are perpendicular to the corresponding arms 24 and of course are also perpendicular to the transverse axle structure 12.

The upper ends of the two arms 24 are also provided with bearing holders 25 which are perpendicular to the arms and parallel to the axes of the lower bearing holders 22. The upper bearing holders 25 journal corresponding spindles 26 which are permanently attached to a mounting plate 28. The mounting plate 28, in turn, may be attached by quick disconnect fittings (not shown) either directly to an air cushion vehicle 15 or directly to an auxiliary cargo conveyance that is carried by an air cushion vehicle. If desired, the mounting plate 28 may be omitted and the upper spindles 26 may be permanently attached to the structure of an air cushion vehicle 15 or directly to an auxiliary cargo conveyance. It is apparent that the lower ends of the two arms 24 are connected by pivots to the corresponding collars 16, 17 and that the upper ends of the two arms are connected by pivots to the structure of the air cushion vehicle, the axes of the four pivots being substantially parallel to the longitudinal axis of the air cushion vehicle.

The lengths of the two arms 24 may be adjusted by turning corresponding threaded collars 30 which are formed with wrench flats 32. Each of these threaded collars has opposite hand threads on its opposite ends into which opposing halves of each of the corresponding arms are screwed. For example, by turning a threaded collar 30, two halves of the corresponding arm may be drawn toward each other to shorten the effective length of the arm.

FIG. 2 is a schematic profile view of the ground wheels assembly attached to the structure of a floating air cushion platform 15 which is subjected to a side force $H_F$. The air cushion platform 18 can move in the direction of the sideward force $H_F$ by sliding the collars 16, 17 along the axle structure 12 with the sliding movement of the collars limited by the corresponding ground wheels 10, 11. Thus, in effect, the two ground wheels 10, 11 serve as stops cooperative with the two collars alternately to limit outward movement of the collars.

Since the opposite ends of the two arms 24 are mounted on parallel pivots, the two arms can only experience axial compressive or tensile forces derived from a side force $H_F$. Under the conditions shown in FIG. 2, there is no axial force in the right hand arm 24 because the right hand collar 17 is free to slide along the axle structure 12 but the other collar 16 cannot move further to the left because it is stopped by the ground wheel 10, and the two ground wheels 10, 11 have a high coefficient of skidding friction relative to the underlying support surface on which they rest. Consequently, the tendency of the air cushion vehicle 15 to move to the left places the left hand arm 24 under large axial compressive force as indicated by the solid diagonal arrow along the axis of the left arm in FIG. 2. The equal and opposite axial compressive forces which exist at the opposite ends respectively of the left arm 24 in FIG. 2 can be resolved into their horizontal and vertical components. The components of force exerted by the air cushion vehicle 15 on the left arm 24 are $H_F$ and $V_F$.

The components of reaction forces exerted by the wheels 10, 11 on the left arm 24 are $H_R$ and $V_R$.

The vertical distance through which the air cushion vehicle 15 can rise above the underlying support surface is fixed by its construction and by the degree of wear on the air seals that confine the air cushions under the vehicle. The vertical distance of the axle structure 12 above the underlying support surface is fixed by the diameter and the degree of wear of the wheels 10, 11. Therefore, the angle $\alpha$ between the arm 24 and the axle structure 12 can be adjusted by adjusting the length of the arm. If the angle $\alpha$ is set so that the numerical ratio of the side force $H_F$ to normal force $V_F$ is less than the coefficient of skidding friction of the wheels on the operating surface, it is physically impossible for the wheels to skid sideways on the operating surface. To facilitate periodic readjustment of the length of an arm 24 to maintain this ratio as the air seals under the air cushion vehicle and the wheels 10, 11 wear during service, reference marks 34, 35 are provided on mounting plate 28 and corresponding reference marks 36, 37 are provided on the outer cylindrical surfaces of upper bearing holders 25. With the air cushion vehicle 15 floating at its normal operating height and with the ground wheels 10, 11 resting on the underlying support surface, the threaded collars 30 may be adjusted to change the lengths of the two arms 24 until the reference marks 34, 35 and 36, 37 are properly aligned.

It is essential that the two arms 24 in FIG. 2 be prevented from swinging over past center under the influence of side forces $H_F$ and for this reason it is desirable to provide means to keep each of the two arms from swinging as far as a position that is perpendicular to the transverse axle structure 12. For this purpose a block 40 is fixedly mounted on the plate 28 to serve as stop means between the two arms.

For proper operation of the ground wheels assembly the wheels 10, 11 must rest solidly on the underlying support surface at all times. Normally the weight of the wheel and axle assembly is sufficient to insure that the wheels always rest on the operating surface. However, due to friction throughout the mechanism, it may be desirable to install a light tension spring 42 to interconnect the slidable collars 16, 17. This spring urges the collars toward each other along the transverse axle structure 12 to cause the wheel and axle assembly to be urged downward against the underlying support surface.

In some applications of air cushion conveyances, it may be desirable to have the ground wheels operative during only part of the working cycle of the equipment. At other times, the wheels might interfere with desired sideward movement of the air cushion conveyance. The lower ends of the two arms may be fitted with lifting eyes 43 to which corresponding chains or tethers 44 are attached, the tethers having hooks 45 at their upper ends. When the ground wheels assembly is in use the tethers 44 are hooked onto lower eyes 46 on the mounting plate 28 with the tethers sufficiently slack to avoid interference with the functions of the two arms 24. When desired the hooks 45 of the tethers may be shifted to corresponding upper eyes 48 on the mounting plate 28 to act under tension to hold the wheels 10, 11 clear of the underlying support surface to permit the air cushion conveyance to be moved freely sidewise.

The invention is not intended to be restricted to any particular arrangement of parts or any of the various details thereof, even where specifically shown and described as the same may be modified in various particulars or may be applied in many varied relations without departing from the spirit and scope of the claimed invention. Practical constructions embodying certain details of the invention are illustrated and described but only for the purpose of complying with the requirements of the statutes for the disclosure of operative embodiments but without attempting to disclose all of the various forms and modifications in which the invention might be embodied.

I claim:

1. In an air cushion vehicle having downwardly extending means to confine air cushions thereunder, the improvement to oppose the tendency of the vehicle to skid sidewise because of lateral slope of the underlying support surfaces that the vehicle is traversing or because of a strong side wind when the vehicle is being operated comprising:

a set of ground wheels on an axle structure;
means connecting the axle structure to the vehicle with freedom for vertical movement of the axle structure relative to the vehicle to permit the ground wheels to track on the underlying support surface throughout a range of elevations of the vehicle from the underlying support surface, said connecting means including means to limit lateral movement of the vehicle relative to the axle structure.

2. An improvement as set forth in claim 1 in which said connecting means comprises a pair of divergent arms pivotally connected to at least one of said vehicle and said axle structure and slidingly connected to the other of said vehicle and said axle structure.

3. An improvement as set forth in claim 2 which includes a pair of laterally spaced slide members on one of said vehicle and said axle structure, said divergent arms being pivotally connected to the slide members respectively.

4. An improvement as set forth in claim 3 in which the slides are sleeves on the axle structure.

5. An improvement as set forth in claim 1 which includes yielding means to urge the axle structure downward to keep the wheels in effective contact with the underlying support surface.

6. An improvement as set forth in claim 1 in which said connecting means comprises:

a pair of downwardly divergent arms;
pivot means connecting upper ends of the two arms respectively to the vehicle;
stop means on the axle structure near the opposite ends respectively thereof;
a pair of spaced slide members on the axle structure between the two stop means and movable along the axis of the axle structure to abut the two stop means alternatively; and
pivot means connecting the lower ends of the two arms to the two slide members respectively,
the axes of the pivot means at the upper and lower ends of the two arms being substantailly parallel to the longitudinal axis of the vehicle,
each of said slide members being cooperative with the corresponding stop means to place the corresponding arm under axial compression at a limit position of the arm to limit the shift of the vehicle toward the corresponding end of the axle structure.

7. An improvement as set forth in claim 6 in which the angle of each arm relative to the axle structure at the limit position of the arm is such that the numerical ratio of the lateral force component to the downward force component of the load on the upper end of the arm is less than the coefficient of skidding friction of the ground wheels on the underlying support surface.

8. An improvement as set forth in claim 7 in which each of said arms is adjustable in length to vary said ratio and to permit periodic adjustment to compensate for wear on the wheels and on said air cushion confining means.

9. An improvement as set forth in claim 6 which includes means fixedly united with the vehicle between the two arms to keep the two arms from swinging to positions perpendicular to the axle structure.

10. An improvement as set forth in claim 6 which includes means to yieldingly urge the axle structure downward from the vehicle to keep the ground wheels in effective contact with the underlying support surface.

11. An improvement as set forth in claim 10 in which said urging means comprises tension spring means interconnecting the two slide members to urge the two slide members toward each other.

12. An improvement as set forth in claim 6 which includes means to releasably suspend the axle structure from the vehicle to keep the pair of ground wheels out of contact with the underlying support surface when desired.

* * * * *